July 28, 1959          A. NELSON          2,896,882

PROPULSION ARRANGEMENT ON MULTI WING AIRCRAFT

Filed Nov. 12, 1954          3 Sheets-Sheet 2

INVENTOR.
Adolph Nelson
BY
ATTORNEY

INVENTOR.
Adolph Nelson
ATTORNEY

United States Patent Office 2,896,882
Patented July 28, 1959

2,896,882

PROPULSION ARRANGEMENT ON MULTI WING AIRCRAFT

Adolph Nelson, East Orange, N.J.

Application November 12, 1954, Serial No. 468,217

1 Claim. (Cl. 244—55)

This invention relates to aircraft of heavier-than-air type and has as a primary object to provide a novel and improved such aircraft characterized by enhanced safety and operative reliability.

A further object of the invention is to provide an aircraft of heavier-than-air type distinguished by stability in flight, certainty of directional control, and security of power supply.

A further object of the invention is to provide an aircraft of heavier-than-air type equipped with auxiliary flight power maintained in operative readiness as an incident of normal flight.

A further object of the invention is to provide an aircraft of heavier-than-air type that is particularly adapted for the commercial transport of passengers and cargo with convenience, security, and economy.

A further object of the invention is to provide an aircraft of heavier-than-air type dirigible with precision and assurance in both vertical and horizontal planes.

A further object of the invention is to provide a novel and improved combination and operative correlation of generally conventional elements in and to constitute a heavier-than-air craft of pronounced operative safety and flight reliability.

A further object of the invention is to provide a novel and improved arrangement and reorganization of generally conventional elements in and to constitute a heavier-than-air craft operable with elimination of some and moderation of others of the hazards peculiar to hitherto conventional flight in analogous equipment.

A further object of the invention is to provide a novel and improved organization and operative correlation of power units and propulsive agents in and to constitute a multi-engine heavier-than-air craft.

With the foregoing and other objects in view, my invention consists in the construction, arrangement, and combination of elements as hereinafter set forth, pointed out in my claim, and illustrated by the accompanying drawings, in which—

Figure 1:
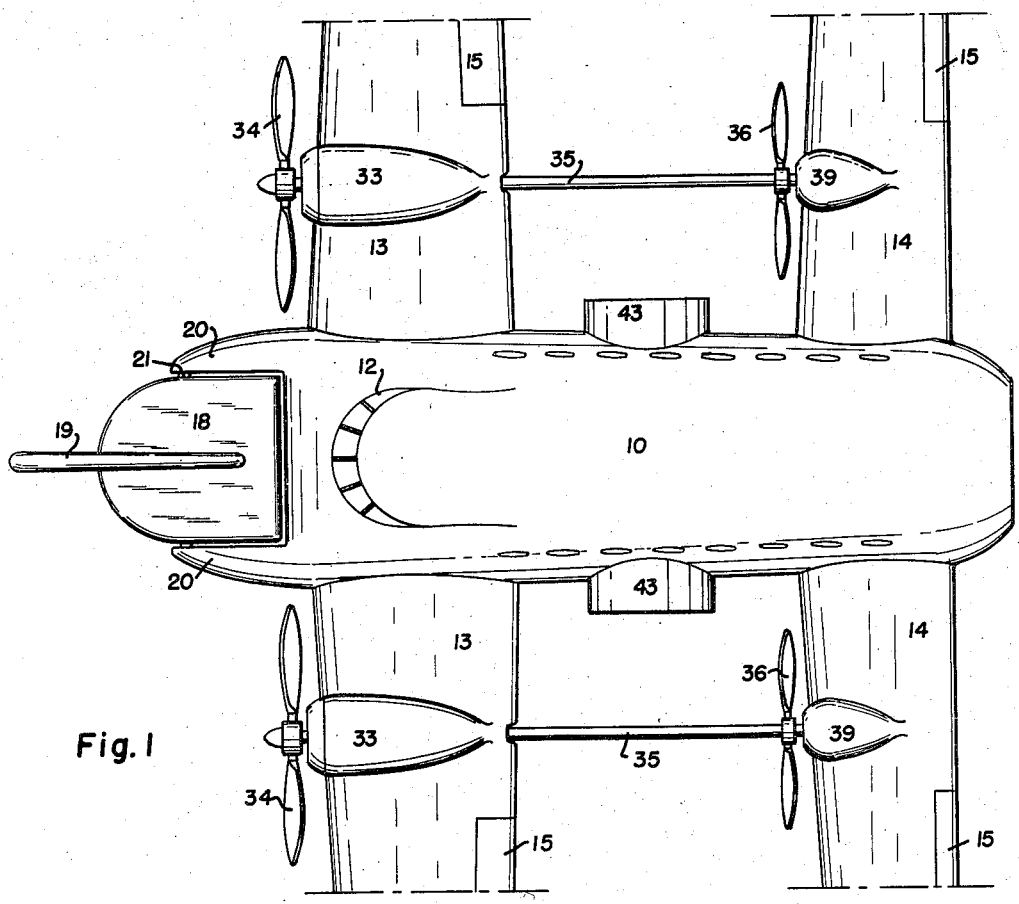
Figure 1 is a top plan view of a heavier-than-air craft typically exemplifying the principles of the invention, tips of the wing elements being broken away to conserve space.
Figure 2:
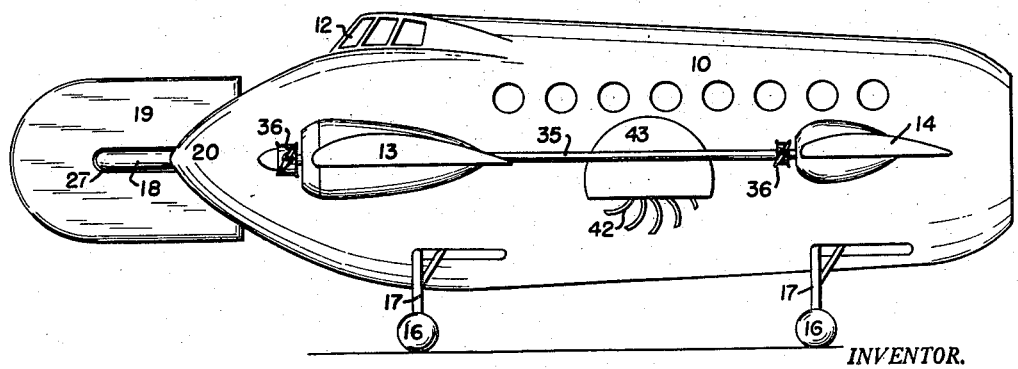
Figure 2 is a side elevation of the arrangement according to Figure 1.
Figure 4:
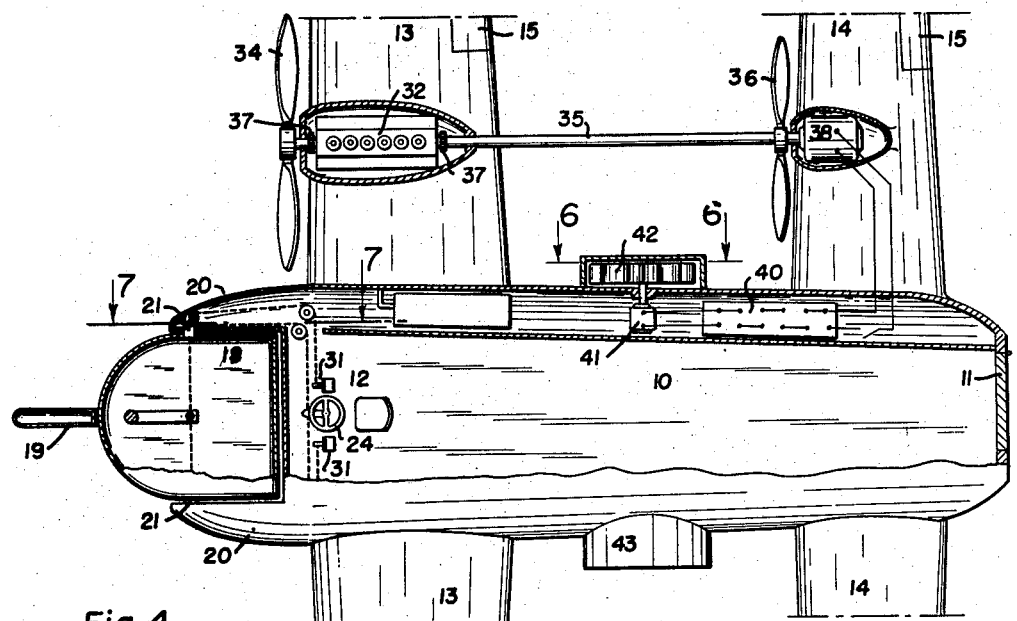
Figure 4 is a partial sectional view taken substantially on the indicated ine 4—4 of Figure 3.
Figure 3:
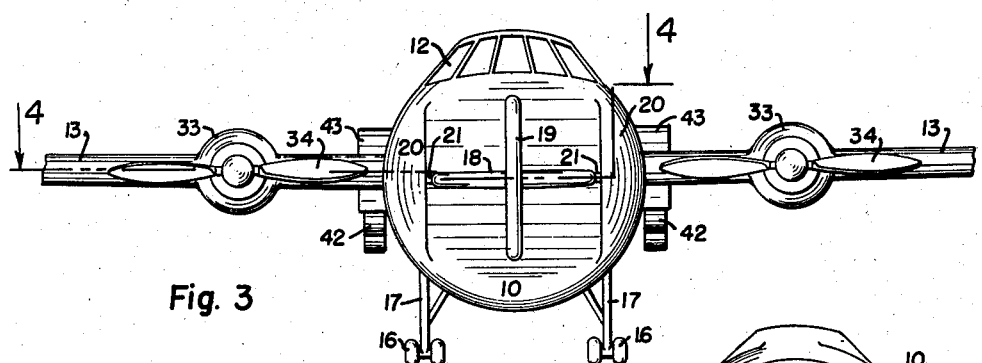
Figure 3 is a front end elevation of the craft shown in the preceding views.
Figure 6:
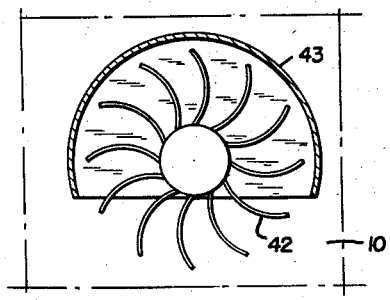
Figure 6 is a fragmentary, detail section, on an enlarged scale, taken substantially on the indicated line 6—6 of Figure 4.
Figure 5:
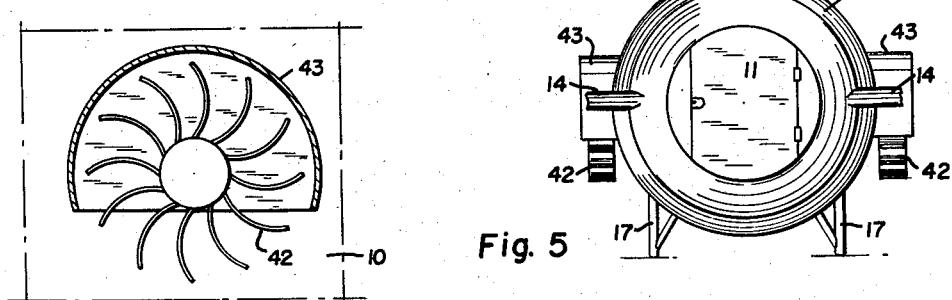
Figure 5 is a rear end elevation of the craft shown in the preceding views, wing and wheel strut elements being broken away to conserve space.
Figure 7:
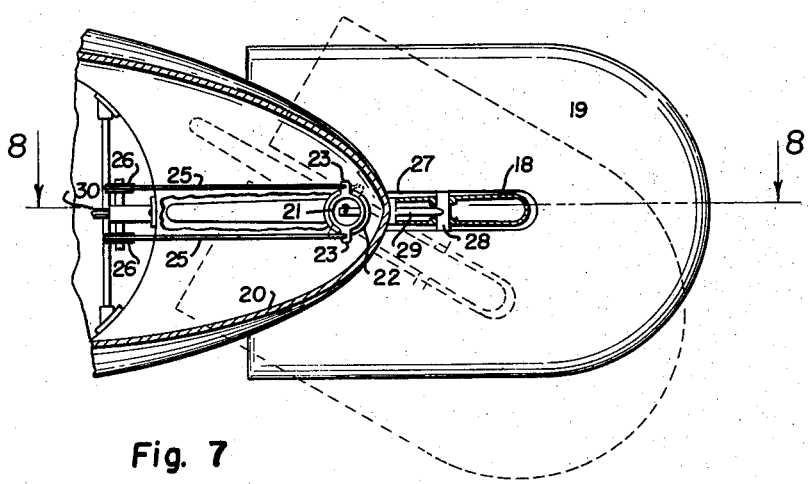
Figure 7 is a fragmentary, detail section, on an enlarged scale, taken substantially on the indicated line 7—7 of Figure 4, an alternative position of relatively movable elements included in the view being indicated by broken lines.
Figure 8:
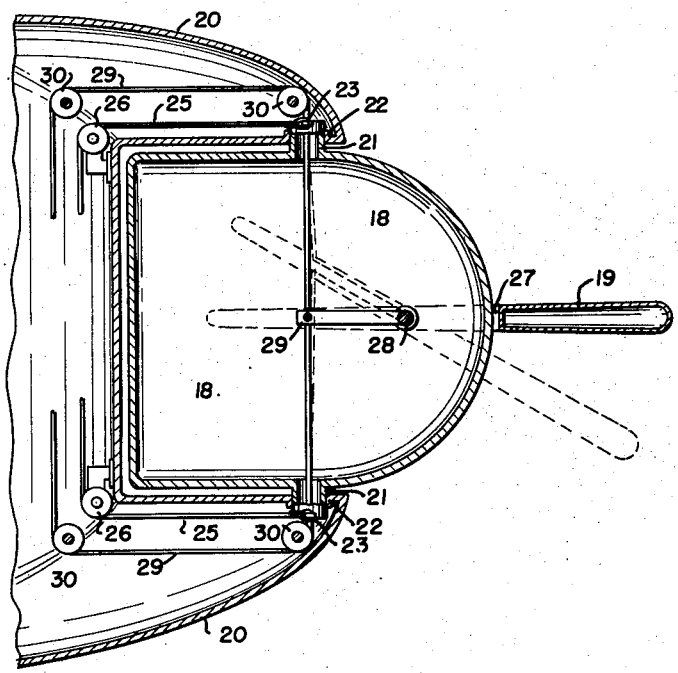
Figure 8 is a fragmentary, detail section, taken substantially on the indicated line 8—8 of Figure 7, wherein broken lines indicate otherwise concealed relationships and an alternative position of one of the relatively movable elements included in the view.

In the organization of the improved aircraft as represented by the drawings, the numeral 10 designates, generally, a rigid body or cabin fuselage adapted, in any appropriate streamlined form and expedient construction, to enclose a capacious interior compartment for the accommodation of passengers or cargo accessible through a door 11 in the blunt rear end of the body, to provide an operator's station or cockpit 12 in its upper forward portion, and to serve as the mounting and support for the associated members and elements requisite to condition the body for flight in accordance with the principles of the invention. Generative of the lift forces essential to flight in accordance with established aerodynamical knowledge, complementary airfoil members 13 fixedly outstand laterally of and oppositely from the forward portion of the body 10 as generally horizontal forward wings aligned perpendicular to the longitudinal axis of the body in a usual manner, and a second pair of complementary airfoils 14 fixedly outstands in registered opposition from a rearward portion of the body in substantial parallelism with and to spacedly trail the members 13 as rearward wings supplementing the lift effect of the forward wings. For lateral control of the craft in flight, the members 13 and 14 may be provided with the usual ailerons 15 hingedly coacting with trailing edges of the members and susceptible of selective adjustment in a customary manner by means of conventional controls available to an operator within the station or cockpit 12. As should be readily apparent, provision of the forward and rearward wing sets in the spaced relationship shown and described contributes to longitudinal stability of the craft in flight, permits elimination of a fixed horizontal fin at the tail of the craft, and distributes the flight load to and through the four airfoils 13 and 14 with structural and operative advantage.

Rollable support of the craft for landings, take-offs, and ground maneuvering is had by means of wheels 16 conventionally carried by the lower ends of struts 17 engaged with and at each side of forward and rearward portions of the body to extend below the latter. As is conventional practice, the struts 17 carrying the wheels 16 may be extensible and retractible relative to the body 10 at the will and under the control of the craft operator, some of the wheels may be arranged to caster freely or to be steered by the operator, and while the use of four wheeled struts in approximately the arrangement illustrated is preferred, other functionally equivalent arrangements, such as a conventional tricycle landing gear, are within the contemplation of the invention.

A significant feature of the invention feasible with the wing and body arrangement shown and described is the provision for directional and pitch control of the craft in flight through rudder and elevator means at the nose, or forward end, of the body 10, whereby to positively and directly guide the nose of the craft along a desired flight path as distinguished from the conventional practice of swinging the craft tail for less than precise control of the craft attitude in the vertical and horizontal planes. Typical of any functionally equivalent and structurally analogous arrangement, the novel pitch and directional controls of the invention are represented as a horizontal rudder, or elevator, panel 18 hingedly associated with the nose of the body 10 to swing about a horizontal axis perpendicular to the longitudinal axis of the craft and a vertical rudder panel 19 carried by and hingedly associated with the panel 18 to swing about an axis offset forwardly from and in perpendicular relation to the hinge axis of said latter panel, and means manipulable by an operator within the station or cockpit 12 for independently swinging said panels in either direction about their respective hinge axes. As illustrated, the nose of the body 10 is formed with a wide, forwardly opening notch extending vertically entirely through the body and defined between laterally registered, spacedly parallel arms 20 fixed extending forwardly from and as continuations of the body sides in a size freely accommodative of slightly more than the rearward half of the panel 18. The panel 18 is a rigid, preferably hollow member of appropriate thin airfoil section formed with a rectangular rear portion loosely receivable within the notch between the arms 20 and an arcuate forward margin. From the opposite sides of the panel 18 fixedly outstand hollow trunnions 21 in an alignment spacedly paralleling the panel rear margin substantially midway of the fore-and-aft length of said panel, and said trunnions are revolubly received in and extend through bearings 22 in the opposed faces and adjacent the tips of the arms 20 to terminate in open ends interiorly of said arms. Mounted as shown and described, the panel 18 is substantially balanced relative to and tiltable about the horizontal axis transverse of the body 10 represented by the aligned axes of the trunnions 21, thus to function as an elevator for control and regulation of craft pitch during flight when and as angularly adjusted about its hinge axis by an operator within the station or cockpit 12. Any appropriate organization and arrangement of means for selective angular adjustment of the panel 18 by an operator may be provided, a typical simple system effective for such purpose being represnted as including ears 23 fixedly and oppositely outstanding from and in alignment diametrically of the free end of each trunnion 21 within the associated arm 20, a wheeled control post 24 within the station or cockpit 12, and flexible connections 25 in guided relation over pulleys 26 operatively engaged with and extending between the ears 23 and post 24 in an operatively obvious and generally conventional manner. The panel 19 is a rigid, preferably hollow member of appropriate thin airfoil section whereof the rear or trailing margin is bisected by a slot 27 accommodative of the thickness of the panel 18 and extending longitudinally and past the midlength of the panel thereby intersected, and a hinge pin 28 fixed in and laterally of the panel 18 perpendicularly traverses said slot 27 at approximately the midlength of the panel and is received in bearings provided in the forward portion of the panel 18 to mount the said panel 19 on, in perpendicular relation with, and to swing about the axis of the pin 28 relative to to panel 19 in all angularly adjusted positions of the latter. Adapting the panel 19 for selective angular adjustment by an operator, a lever 29 fixed to the hinge pin 28 and extending perpendicularly and rearwardly therefrom within the thickness of the panel 18 has its free end secured to a flexible connection which extends thence in both directions through the hollow trunnions 21 and is guided through the arms 20 by pulleys 30 to attachment to rudder pedals 31, or equivalent manipulable means, within the station or cockpit 12. As so mounted and connected for selective adjustment about its pivotal mounting on the panel 18, said panel 19 is arranged for the directional control of craft flight in every operative position of angular adjustment to which the panel 18 may be moved.

A further significant feature of the invention materially contributing to the safety and security of craft flight is the organization, disposition, and arrangement of the means whereby the craft is powered for flight. In initial conformity with conventional practice, the power means of the invention includes internal combustion engines 32, of any appropriate type and construction, carried by and preferably within nacelles 33 on the airfoils 13 of the forward wing set outboard from and at the opposite sides of the body 10 in any determined number and operatively balanced relationship and in driving relation with propellers 34, either tractor or pusher mounted, individually associated therewith. In a departure from conventional practice, each of the propellers 34 is mounted on and in driven relation with a shaft 35 which extends parallel to the longitudinal axis of the body 10 in journaled relation with and to span between the airfoils 13 and 14 of the forward and rearward wing sets at each side of said body and which mounts a second propeller 36 in driven relation therewith operatively adjacent the rearward airfoil 14, whereby to couple the propellers 34 and 36 of each such shaft 35 for simultaneous and supplementing development of thrust when the shaft is power-driven. Giving further effect to the novel principles of the invention, the engines 32 are clutch-engageable, as at 37, through any appropriate means under the control of the craft operator, with and to drive the shafts 35 respectively associated therewith and in such manner as to permit optional declutching of the engine from the associated shaft without restricting the freely-rotatable arrangement of the shaft and the two propellers 34 and 36 carried thereby. Auxiliary power employable as an alternative, and perhaps as a supplement, to that of the engines 32 is provided in the form of an electric motor 38 housed within a nacelle 39 on the airfoil 14 of the rearward wing set in driving relation, expediently through selectively-actuable clutch means, not shown, with the rearward end of each shaft 35, whereby each shaft 35 with its propellers 34 and 36 is adapted to be driven by an engine 32, or by a motor 38, alternatively, and conceivably simultaneously, as the judgment and consequent control manipulations of the operator may determine.

Power for the motors 38 is derived from batteries 40, or the equivalent, housed within the body 10 in a usual manner, and such batteries are expediently maintained at charge as an incident of craft flight, by means of generators 41 carried by and within the body 10 in driven relation with fans or windwheels 42, of any practical type and construction rotatively reactive to an air stream, exteriorly adjacent the sides of the body 10 between the airfoils 13 and 14. As illustrated, the fans or windwheels 42 may be of radial blade type with the blades curved, pocketed, or bucketed, for maximum efficiency in reaction to air flow, and said elements 42 are partially shrouded within housings 43 closing against and preferably faired into the body 10 to expose to the air stream generated by craft flight only that portion of the element on which it is desired that the air flow shall act. Thus, normal flight operation of the craft under power of the engines 32 is applied through the elements 42 and generators 41 to maintain the batteries 40 at charge and in readiness to power the motors 38, which latter are thus made available to supplement the engines 32, as on take-off, and to extend the flight in substitution for some or all of said engines upon failure of the latter, for any reason whatsoever.

Manifestly, the aircraft of the instant invention may be furnished with conventional adjuncts and appurtenances facilitative of its operation and is susceptible of flight and handling with little deviation from conventional techniques, the novelties of the invention materially enhancing the safety and security of flight and moderating the known hazards characterizing flight of hitherto conventional heavier-than-air craft.

Since changes, variations, and modifications in the form, construction, and arrangement of the elements shown and described may be had without departing from the spirit of my invention, I wish to be understood as being limited solely by the scope of the appended claim, rather than by any details of the illustrative showing and foregoing description.

I claim as my invention:

A heavier-than-air craft comprising, a fuselage, forward and rearward wing sets fixedly outstanding laterally from the sides and in spaced relation longitudinally of said fuselage adjacent the forward and rearward ends thereof, wheels for the rollable ground support of said fuselage, flight control means for said aircraft, propeller means for the propulsion of the craft in flight carried by both of said wing sets at each side of the fuselage, engines mounted in one of said wing sets selectively engageable with and to drive both of said propeller means, electric motors mounted in the other of said wing sets selectively engageable with and to drive one of said propeller means, secondary batteries carried by the fuselage to power said motors, electric generators associated with and to charge said batteries, and windwheels in driving relation with said geenrators exteriorly exposed between the wing sets at each side of the fuselage.

References Cited in the file of this patent

UNITED STATES PATENTS

| | | |
|---|---|---|
| 1,107,494 | Chase | Aug. 18, 1914 |
| 1,364,472 | Andrews | Jan. 4, 1921 |
| 1,634,167 | Wilson | June 28, 1928 |
| 1,720,960 | Lilley | July 16, 1929 |
| 1,747,334 | Sundstedt | Feb. 18, 1930 |
| 1,890,059 | Lake | Dec. 6, 1932 |
| 2,406,625 | Oglesby | Aug. 27, 1946 |
| 2,681,776 | Howard | June 22, 1954 |

FOREIGN PATENTS

| | | |
|---|---|---|
| 8,486 | Great Britain | of 1913 |